(12) United States Patent
Neilson (10) Patent No.: US 10,234,921 B2
(45) Date of Patent: Mar. 19, 2019

(54) SYSTEMS AND METHODS FOR OPERATING A VIRTUAL POWER ENVIRONMENT

(71) Applicant: SCHNEIDER ELECTRIC USA, INC., Andover, MA (US)

(72) Inventor: Stuart Neilson, Brentwood (CA)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 342 days.

(21) Appl. No.: 15/060,956

(22) Filed: Mar. 4, 2016

(65) Prior Publication Data

US 2017/0255244 A1  Sep. 7, 2017

(51) Int. Cl.
| G06F 1/00 | (2006.01) |
| G06F 1/28 | (2006.01) |
| G06F 3/06 | (2006.01) |
| G06F 11/34 | (2006.01) |

(52) U.S. Cl.
CPC .............. *G06F 1/28* (2013.01); *G06F 3/0619* (2013.01); *G06F 3/0653* (2013.01); *G06F 3/0664* (2013.01); *G06F 3/0683* (2013.01); *G06F 11/3457* (2013.01)

(58) Field of Classification Search
None
See application file for complete search history.

(56) References Cited

U.S. PATENT DOCUMENTS

| 7,693,963 | B2 | 4/2010 | Johnson et al. |
| 8,289,182 | B2* | 10/2012 | Vogel ........................ H04Q 9/00 340/870.02 |
| 9,092,251 | B2* | 7/2015 | Grouzdev ........... G06F 9/45558 |
| 9,519,787 | B2* | 12/2016 | Novak .................. G06F 21/575 |
| 9,588,774 | B2* | 3/2017 | Gschwind ............. G06F 9/4403 |
| 2005/0120160 | A1* | 6/2005 | Plouffe ............... G06F 9/45537 711/1 |
| 2006/0025981 | A1 | 2/2006 | Papaefstathiou et al. |
| 2010/0115342 | A1 | 5/2010 | Shigeta et al. |
| 2010/0318973 | A1* | 12/2010 | Rautiainen ............. G06F 9/455 717/135 |

(Continued)

FOREIGN PATENT DOCUMENTS

WO    2015041670 A1    3/2015

OTHER PUBLICATIONS

Extended European Search Report from corresponding European Application No. 17153361.5 dated Apr. 18, 2017.

*Primary Examiner* — Nitin C Patel
(74) *Attorney, Agent, or Firm* — Lando & Anastasi, LLP (57) ABSTRACT

A computer system for hosting a virtual power system environment includes a plurality of virtual devices, wherein at least one of the plurality of virtual devices is configured to simulate the function of at least one physical device in a power system, a virtual device manager configured to perform at least one operation on the plurality of virtual devices, a virtual power monitor configured to control a function of the plurality of virtual devices, a simulation engine configured to simulate a performance of the plurality of virtual devices according to conditions detected on the power system, and a configuration generator configured to generate a configuration for a physical power monitor according to a configuration of the virtual power monitor.

20 Claims, 5 Drawing Sheets

(56) References Cited

U.S. PATENT DOCUMENTS

| | | | |
|---|---|---|---|
| 2011/0010713 A1* | 1/2011 | Matsumoto | G06F 9/4881 718/1 |
| 2011/0213997 A1* | 9/2011 | Kansal | G06F 1/3203 713/324 |
| 2014/0125125 A1* | 5/2014 | Wyatt | H02J 3/008 307/18 |

* cited by examiner

SYSTEMS AND METHODS FOR OPERATING A VIRTUAL POWER ENVIRONMENT

BACKGROUND

1. Field of Invention

Aspects and embodiments of the present disclosure are directed to systems and methods for monitoring and simulating the performance of electrical systems.

2. Discussion of Related Art

Power monitoring systems and components thereof often need to be updated. For example, hardware and software components of meters and other devices are upgraded; devices are added, swapped out, or removed; and entire systems (or subsystems) developed from the ground up and deployed. Deploying such changes in a working power system involves risk, in that unexpected complications may lead to unexpected system behavior or outages.

Solutions for troubleshooting or testing a power system monitoring configuration in a test environment are known. In particular, solutions exist for scanning an existing monitoring configuration in order to create a virtual copy that technical support personnel can troubleshoot. Solutions also exist for testing software on a virtual meter before deploying the software to a meter in an active (physical) power system. These existing approaches have a number of drawbacks, however, including that the configuration of, and components in, power systems may change relatively frequently. This dynamic quality makes it cumbersome to implement and test changes to an existing power system monitoring environment.

SUMMARY

According to one aspect of the present invention, a computer system for hosting a virtual power system environment includes a plurality of virtual devices, wherein at least one of the plurality of virtual devices is configured to simulate the function of at least one physical device in a power system, a virtual device manager configured to perform at least one operation on the plurality of virtual devices, a virtual power monitor configured to monitor and control a function of the plurality of virtual devices, a simulation engine configured to simulate a performance of the plurality of virtual devices according to conditions detected on the power system, and a configuration generator configured to generate a configuration for a physical power monitor according to a configuration of the virtual power monitor. According to one embodiment, at least one physical device in the power system is a metering device, and the at least one virtual device is configured to simulate the at least one metering device on the power system. According to another embodiment, the at least one operation is selected from the group consisting of an add operation, a modify operation, and a delete operation.

According to one embodiment, the at least one operation includes an operation to modify a firmware component of one of the plurality of virtual devices. According to one embodiment, a second at least one of the plurality of virtual devices represents at least one physical device not in the power system. According to another embodiment, the virtual device manager further includes a web-based user interface configured to receive an instruction to perform the at least one operation. According to another embodiment, the virtual device manager is further configured, responsive to detecting a change to at least one physical device in the power system, to effect the change on at least one of the plurality of virtual devices. According to another embodiment, the virtual power monitor is further configured to selectively control a function of the power system. According to another embodiment, the virtual device manager is implemented as software as a service (SaaS).

According to another aspect of the present invention, a method for operating a virtual power system environment includes acts of creating, in a virtual environment, at least one virtual device having a first characteristic and configured to simulate a performance of at least one physical device in a power system, modifying the first characteristic to be a second characteristic, simulating a performance of the virtual environment according to actual conditions detected on the power system and the at least one virtual device having the second characteristic, and creating a configuration for the at least one physical device, the configuration including the second characteristic. According to one embodiment, the first characteristic is a first value for a configuration setting for the at least one device, and the second characteristic is a second value for the configuration setting. According to another embodiment, the first characteristic is a first version of firmware for at least one physical device corresponding to the at least one virtual device, and the second characteristic is a second version of firmware. According to another embodiment, the first characteristic indicates that the at least one virtual device is active, and the second characteristic indicates that the at least one virtual device is inactive. According to another embodiment, the method includes creating, in the virtual environment, a second at least one virtual device not corresponding to a physical device in the power system.

According to one embodiment, the method includes monitoring the at least one physical device in the power system, detecting a modification to at least one physical device, the at least one physical device corresponding to a first virtual device, and modifying the first virtual device according to the modification to the at least one physical device. According to another embodiment, detecting the modification to the at least one physical device includes detecting that the at least one physical device has been deactivated, and modifying the first virtual device according to the modification to the at least one physical device includes deactivating the first virtual device.

According to one embodiment, the method includes generating a configuration for the virtual power monitor. According to another embodiment, the method includes validating the configuration for the virtual power monitor by determining that the configuration is suitable for use as a configuration for a physical power monitor in the power system. According to one embodiment, the method includes storing the first characteristic and the second characteristic, and responsive to a determination that the at least one physical device having the second characteristic has performed undesirably, creating a second configuration for the at least one physical device, the second configuration including the first characteristic.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

This disclosure is not limited in its application to the details of construction and the arrangement of components set forth in the following description or illustrated in the drawings. The disclosed systems and methods are capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

As discussed above, a drawback of current approaches is that the dynamic nature of power monitoring systems makes it cumbersome to implement and test changes to an existing power system monitoring environment. The currently-available systems also do not provide a way to automatically roll out to a live power system changes that have been implemented and tested in a test environment. Various aspects and embodiments disclosed herein overcome those drawbacks by providing a system that continuously or periodically checks a power system monitoring environment to detect any changes to the environment, such as the addition, modification, or removal of devices. A virtual environment is created and updated according to changes made to the power system, so that a virtual environment that mirrors the physical environment is readily available. Users may run tests on the virtual environment to see how it performs under test conditions, including actual historic conditions recorded from the power system itself. Users may also use the mirrored virtual environment as a starting point to modify the virtual environment, in order to test contemplated or planned changes to the power system. Changes are logged in a manner that allows them to be rolled back in both the virtual environment and the power system in the event that becomes necessary.

Various aspects and embodiments disclosed herein include systems and methods for creating and monitoring virtual power system monitoring environments that simulate the structure and performance of devices (e.g., monitors) in an electrical distribution system. Aspects and embodiments disclosed herein include a system capable of constantly monitoring a power system to detect changes, such as the addition, modification, or removal of a device. The changes are replicated in a virtual environment in order to create a "mirrored" virtual environment suitable for testing configuration changes and simulated events (e.g., voltage sag) before rolling out the virtual environment configuration to the power system. Aspects and embodiments disclosed herein also include a simulation engine capable of simulating one or more conditions, events, or phenomena in the virtual environment. Aspects and embodiments disclosed herein also include a virtual power monitor configured to selectively control the operation of a power system in the event that the physical power monitor is offline or otherwise unavailable. Aspects and embodiments disclosed herein also include a system capable of tracking changes to the virtual environment to allow for "rolling back" those changes in the event they fail to meet certain criteria, or cause the system to operate in an undesirable or unexpected manner.

Figure 1:
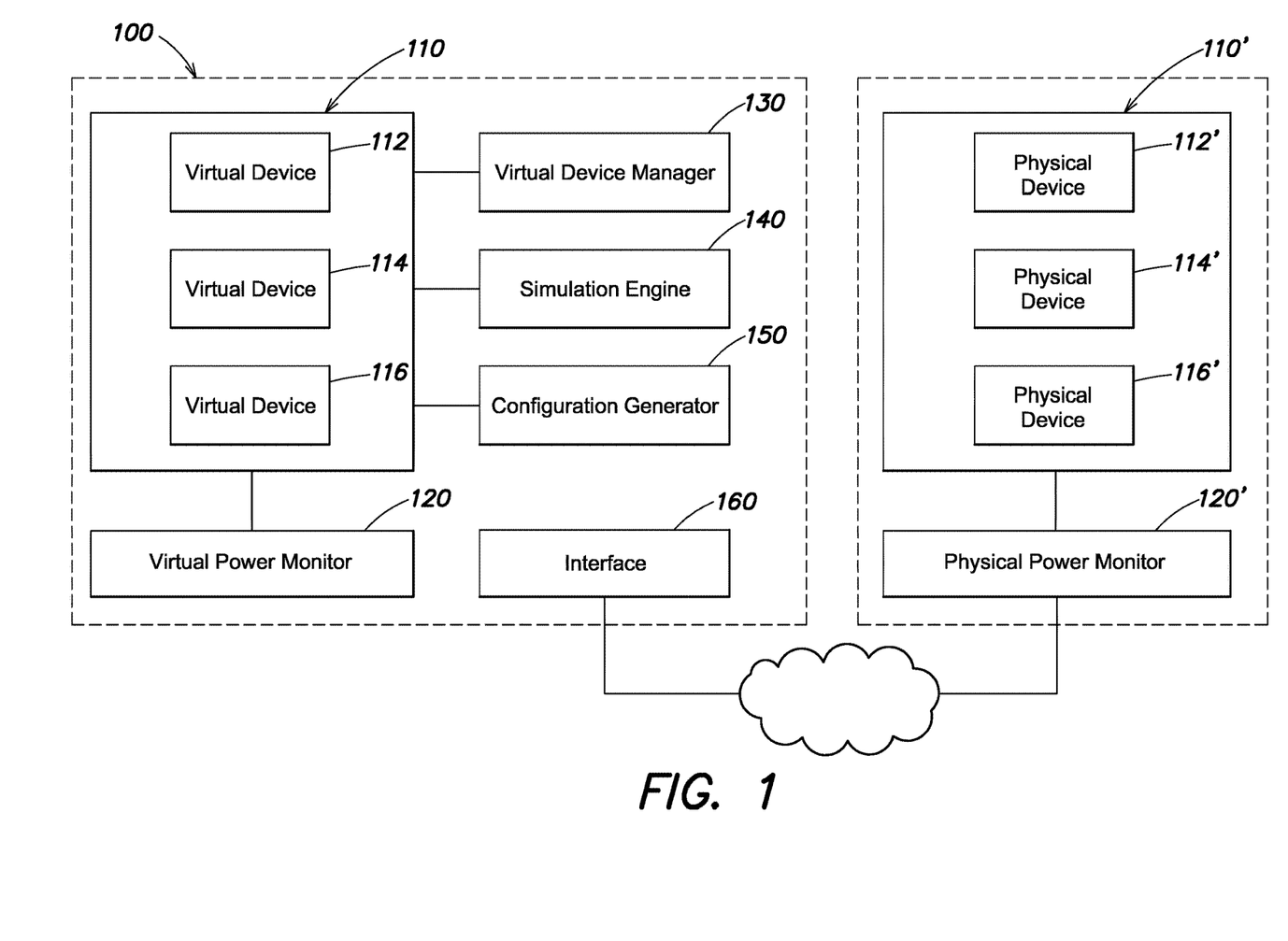
FIG. 1 is a schematic of an embodiment of a system for operating a virtual power system environment.

An embodiment of a virtual power system environment is illustrated schematically, generally at 100, in FIG. 1. The system 100 includes a virtual environment 110 that includes one or more virtual devices 112, 114, 116. In some embodiments, the virtual environment 110 is intended to mirror, represent, or model a physical environment 110' in an existing or planned power system. The physical environment 110' includes one or more physical devices 112', 114', 116'. The virtual devices 112, 114, 116 may be configured to model the structure, purpose, or function of the corresponding physical devices 112', 114', 116'.

The virtual environment 110 may be deployed as part of a cloud-based or Software-as-a-service (SaaS) application. The capability may be provided for one or more users to access the virtual environment 110 remotely to view, modify, or otherwise interact with the virtual environment 110. In some embodiments, the virtual environment 110 may be provided on a dedicated server, or may be on a standalone system.

The virtual devices 112, 114, 116 may be provided in the virtual environment 110 as a hosted application or software as a service (SaaS), and may represent any of a number of components found in a power system. While the embodiments discussed herein refer to the virtual devices 112, 114, 116 as meter devices, the virtual devices 112, 114, 116 may also include generators, transformers, power conditioners, inverters, buses, rectifiers, transmission lines or other components.

In some embodiments, the virtual devices 112, 114, 116 are configured to function and react to simulated conditions in the virtual environment 110 in a manner as close as possible to the way counterpart physical devices 112', 114', 116' would react to similar conditions in the physical environment 110'. For example, the virtual devices 112, 114, 116 may be configured to operate according to the same firmware used in physical devices 112', 114', 116'. As another example, the virtual devices 112, 114, 116 may be configured according to the configuration settings used in physical devices 112', 114', 116'.

A virtual power monitor 120 is also provided with the virtual environment 110. The virtual power monitor 120 allows for monitoring and controlling the simulated function of the virtual devices 112, 114, 116 and any other components of the virtual environment 110. The virtual power monitor 120 may be configured to simulate the performance of a physical power monitor 120' in the physical environment 110'. For example, the virtual power monitor 120 may control the operation of the virtual devices 112, 114, 116 according to the same parameters by which the physical power monitor 120' controls the physical devices 112', 114', 116' in the physical environment 110'.

In some embodiments, the virtual power monitor 120 is a software-based application, such as the Power Monitoring Expert (PME) software package offered by Schneider Electric of Rueil-Malmaison, France. In some embodiments, the virtual power monitor 120 may be a separate component operating on the virtual environment 110, whereas in other embodiments the virtual power monitor 120 is part of the virtual environment 110, such as a process or software module executing the virtual power monitor 120 in the virtual environment 110.

In some embodiments, the virtual power monitor 120 may be configured to optimize the performance of virtual environment 110 or its individual components by changing configuration settings for the virtual environment 110 or virtual devices 112, 114, 116. The virtual power monitor 120 may also provide one or more interfaces for allowing users and/or other systems to interact with the virtual environment 110. Such interfaces may allow for interaction with the virtual environment 110 and/or virtual devices 112, 114, 116, including such functionality as power quality analysis and compliance monitoring, trend graphing and aggregation, alarming and event logging, preconfigured and custom reports, manual or automated control of the devices or environment 110, monitoring dashboards, and other interface components or features.

In some embodiments, the virtual power monitor 120 may have the ability to selectively control the physical environment 110'. This may be particularly useful where the configurations of the virtual environment 110 and the virtual power monitor 120 mirror the configurations of the physical environment 110' and the physical power monitor 120', respectively. In the event that the physical power monitor 120' becomes disabled or otherwise unable to monitor and control the physical environment 110', the virtual power monitor 120 may be configured to act as a highly-available backup, controlling the physical environment 110' via the interface 160 or by other means. In some embodiments, the virtual power monitor 120 may be used to temporarily replace the physical power monitor 120' for some period of time. This may be useful in a situation where an issue with the physical power monitor 120' and/or physical environment 110' is identified and a fix implemented and tested in the virtual power monitor 120 and/or virtual environment 110; where the downtime associated with propagating the fix to the physical environment is undesirable, the virtual power monitor 120 may be used to control the physical environment 110' until the physical power monitor 120' and/or physical environment 110' is updated and validated, possibly during a period of low power demand.

A virtual device manager 130 is also provided. The virtual device manager 130 may configure the virtual environment 110 by adding, modifying, or remove virtual devices 112, 114, 116. Modifying the virtual environment 110 in this way may be useful by replicating the physical environment 110'. The virtual environment 110 can then be used to test how the physical environment 110' would perform under certain conditions. Modifications may also be made to the virtual environment 110 in order to test new configurations (e.g., a new software version for a physical device) before rolling out the new configuration to the physical environment 110'.

In some embodiments, the virtual device manager 130 is configured to obtain information about the physical environment 110' (including physical devices 112', 114', 116') or the physical power monitor 120', and is configured to configure the virtual environment 110 according to characteristics of the physical environment 110'. The virtual device manager 130 may obtain information from the physical environment 110' directly or indirectly via an interface 160 connected to a network (e.g., the Internet). In some embodiments, a user interface may also be provided to allow a user to interact with the virtual device manager 130 in order to directly configure the virtual environment 110.

The virtual device manager 130 may constantly or periodically monitor the physical environment 110' to detect any changes made to it. In some embodiments, the virtual device manager 130 may incorporate a Platform-as-a-service (PaaS) to monitor the physical environment 110'. Consider an exemplary situation where virtual devices 112, 114 exist in the virtual environment 110, corresponding to physical devices 112', 114' in the physical environment 110'. The virtual device manager 130 then detects that a new physical device 116' has been added to the physical environment 110'. In response, the virtual device manager 130 obtains information about the physical device 116', including device make, model, firmware version, software version, or any configuration or parameter settings, such as alarm parameters, data capture settings, sensitivity or threshold settings, and the like. The virtual device manager 130 then creates a new virtual device 116 with the same characteristics as the physical device 116', and deploys it in the virtual environment 110.

In some embodiments, the information used to create the virtual device 116 may be obtained from the physical device 116' by the virtual device manager 130 via the interface 160. In other embodiments, the virtual device manager 130 may obtain information about the physical device 116' from a database of known physical devices or device types.

Figure 2:
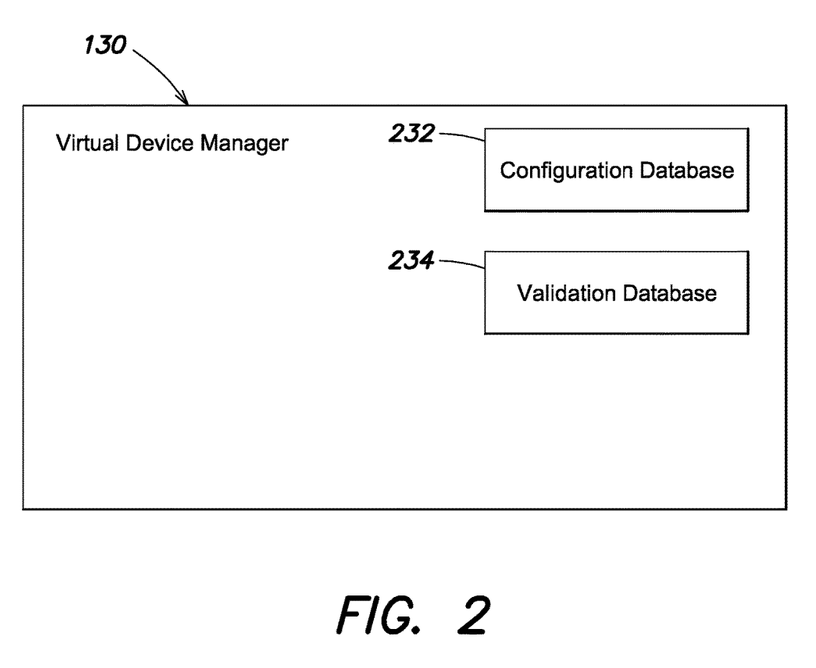
FIG. 2 is a schematic of a virtual device manager in the embodiment of FIG. 1.

FIG. 2 is a block diagram of a virtual device manager 130 according to some embodiments. To continue the previous example with reference to FIG. 2, in some embodiments, only some information about the physical device 116' may be obtained directly from the physical device 116'. For example, a type or other identifier may be obtained from the physical device 116'. Once the type of the physical device 116' is obtained, the virtual device manager 130 may access a configuration database 232 to obtain characteristics and configuration information used in creating the virtual device 116. For example, if the virtual device manager 130 determines that the physical device 116' is a PowerLogic CM4000T meter of the type offered by Schneider Electric, a virtual device 116 representing that particular meter may be obtained from the configuration database 232 by the virtual device manager 130. Data in the configuration database 232 may be stored in any of a number of formats, for example, in flat or delimited files, spreadsheet formats (e.g., Microsoft Excel) or in a relational or non-relational database. In some embodiments, the configuration database 232 may be a configuration file in which certain values are provided for parameters for each particular virtual device.

The virtual device manager 130 may also incorporate a validation database 234 containing solution configuration rules or other validation criteria with which any changes to the virtual environment 110 must comply. The validation criteria may be provided with the system 100 or by users or administrators, and may be configurable. The validation criteria may represent physical constraints of the system, defined thresholds or limits, or contractual or regulatory requirements. For example, the validation criteria may identify certain configuration parameters or conditions that must be satisfied. If the validation criteria are not satisfied, the virtual device manager 130 may disallow the configuration of the virtual environment 110, or may warn the user and/or require an override in order to allow the configuration. Different validation criteria may be provided for different types of components or environments.

Returning to FIG. 1, consider another exemplary situation where virtual devices 112, 114, 116 exist in the virtual environment 110, corresponding to physical devices 112', 114', 116' in the physical environment 110'. The virtual device manager 130 then detects that the firmware on the physical device 114' has been updated to a new version (i.e., modified). In response, the virtual device manager 130 obtains updated information about the physical device 114', including an identifier of the new firmware version, or the new version of the firmware itself. The virtual device manager 130 then modifies the virtual device 114 to cause it to function in the virtual environment 110 according to the new firmware version.

Consider another exemplary situation where virtual devices 112, 114, 116 exist in the virtual environment 110, corresponding to physical devices 112', 114', 116' in the physical environment 110'. The virtual device manager 130 then detects that the physical device 112 has been taken offline or otherwise removed from service. The virtual device manager 130 then deletes or disables the virtual device 112 within the virtual environment 110.

The virtual device manager 130 may also modify the virtual environment 110 and/or the virtual devices 112, 114, 116 according to a planned or possible configuration of the physical environment 110'. For example, the virtual device manager 130 may modify a virtual device 112 by applying a new configuration. After the new configuration has been validated for the virtual device 112 in the virtual environment 110, the configuration may be applied to the corresponding physical device 112' in the physical environment 110'. In this manner, upgrades and other modifications to the physical environment 110' may be tested in the virtual environment 110 and any issues identified before the modification is applied to the physical environment 110'.

The virtual device manager 130 may also be configured to automatically locate and apply firmware updates and other configuration changes. For example, the virtual device manager 130 may, via the interface 160, automatically query servers associated with firmware vendors to determine if updates are available for physical devices 112', 114', 116'. If so, the updates may be automatically obtained and applied to the corresponding virtual devices 112, 114, 116.

A simulation engine 140 is also provided. The simulation engine 140 simulates, in the virtual environment 110, conditions or phenomena that have been or may be experienced in the physical environment 110'. For example, events such as loads switching on or off, simulated faults, or voltage spikes or sags may be applied to the virtual environment 110. The virtual power monitor 120 can then interact with and/or monitor the performance of the virtual environment 110 in response to the conditions or phenomena.

Consider an exemplary scenario where virtual devices 112, 114, 116 in the virtual environment 110 represent physical devices 112', 114', 116' in the physical environment 110', and a new configuration for physical device 112' is being considered. The virtual device 112 represents a meter intended to isolate or otherwise protect virtual device 114 (in this example, a switch) from adverse, potentially damaging events. When the virtual device 114 is isolated, however, virtual device 116 (in this example, a backup switch) must be enabled to take its place. In this scenario, the simulation engine 140 may be used to test the virtual environment by simulating, on the virtual device 112, a voltage spike, an adverse event that can damage sensitive equipment like switches. The response of the virtual environment 110 to the simulated voltage spike can be observed by the virtual power monitor 120. If the virtual device 112 performs as expected, the virtual device 114 is successfully isolated, and the virtual device 116 is enabled, the test may be considered a success. In that case, the configuration of the virtual device 112 and/or the virtual power monitor 120 may be applied to the physical device 112' and/or the physical power monitor 120', respectively. If the virtual device 112 or any other component of the virtual environment 110 does not respond as expected, however, further configuration changes and testing may be required.

The simulation engine 140 may be configured to apply one or more conditions or phenomena to the virtual environment 110 as individual simulated events, or as part of a battery or suite of tests. In some embodiments, test suites may be provided with the system 100, so that the virtual environment 100 can be tested against expected or possible phenomena (or series or cascades of phenomena). The simulation engine 140 may also allow for customizable or user created test programs.

In some embodiments, the simulation engine 140 may be configured to record and/or apply to the virtual environment 110 historical conditions observed in the physical environment 110'. For example, an hour's worth of periodic voltage readings on a physical environment 110' may be recorded, and one or more phenomena, such as voltage sag, detected. The simulation engine 140 may store the data in any of a number of formats, including in flat or delimited files, spreadsheet formats (e.g., Microsoft Excel) or in a relational or non-relational database. Upon request, the simulation engine 140 may be configured to "play back" the voltage readings in the virtual environment 110, so that the virtual power monitor 120 can observe how the virtual environment 110 would react.

The simulation engine 140 may also record how the virtual environment 110 performs over a certain period of time, allowing for later review and investigation.

In some embodiments, the virtual environment 110 or components thereof may be configured to track changes to the virtual environment 110 over time. For example, where a configuration of a virtual device 112 is changed, both the new and old configurations are archived. In the event that a modification to the virtual environment 110 must be reverted to an earlier configuration, the tracked changes may be used to "roll back" the virtual environment to any previous point in time for which a configuration is archived.

A configuration generator 150 may be provided. The configuration generator 150 generates a configuration for the physical environment 110' and/or the physical power monitor 120' based on the configuration of the virtual environment 110 and/or the physical power monitor 120. The configuration generator 150 may also be used to generate a configuration for the virtual environment 110 and/or the physical power monitor 120 based on the physical environment 110' and/or the physical power monitor 120'.

Where the configuration of more than one component in the physical environment must be updated, the configuration generator 150 may automatically generate an optimized change plan for rolling out the configuration updates to the physical environment 110' in a logical manner. For example, where both a lower-level component and a higher-level component dependent on the lower-level component are to have their firmware updated, the configuration generator 150 may determine that updating the lower-level component before the higher-level component will avoid any version incompatibility issues, and may schedule the change accordingly. The configuration generator 150 may also schedule the change for an optimal time of day based on demand, availability requirements, staffing, and the like.

In some embodiments, aspects of the virtual environment 110 will differ from the physical environment 110' due to the fact that the former is a simulated environment whereas the latter represents a physical system or device. For example, a configuration file may be stored in a RAM memory of a physical device, whereas the configuration of the corresponding virtual device may be stored as a record in a database in the virtual environment 110. The configuration generator 150 may therefore map or otherwise translate the configuration of the virtual environment 110 (or aspects thereof) to a configuration format suitable for use in the physical environment 110'.

The virtual environment 110, virtual power monitor 120, virtual device manager 130, simulation engine 140, configuration generator 150, and interface 160 are illustrated as discrete elements in FIG. 1 for purposes of clarity. It will appreciated, however, that one or more of those elements may be combined into a single device, component, or system. For example, each of the virtual environment 110, virtual power monitor 120, virtual device manager 130, simulation engine 140, configuration generator 150, and interface 160 may be embodied on one or more servers accessible over a network, such as the Internet. In some embodiments, the elements may be provided via a cloud delivery model.

Figure 3:
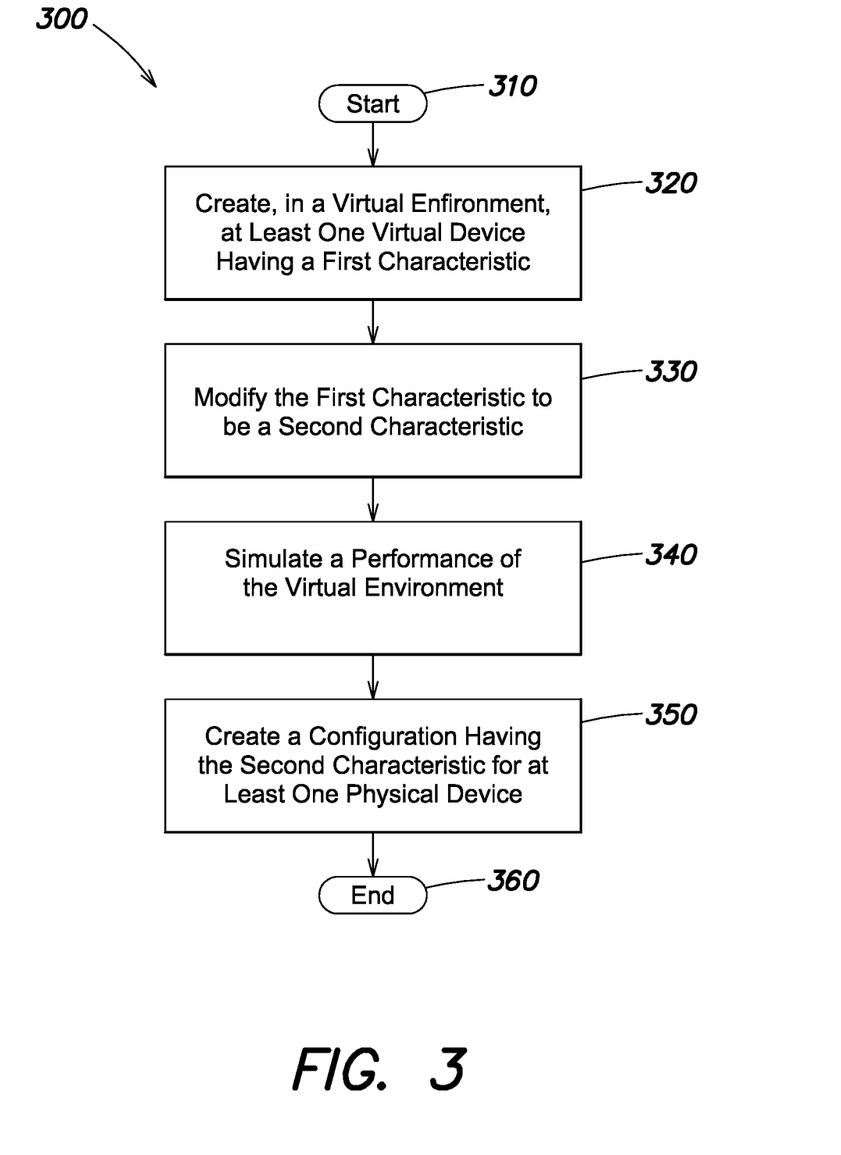
FIG. 3 is a flowchart of a method of for operating a virtual power system environment.

An embodiment of a method for operating a virtual power system environment is illustrated generally at 300 in FIG. 3.

At step 310, the method begins.

At step 320, at least one virtual device, having a first characteristic and configured to simulate a performance of at least one physical device in a power system, is created. In the example of FIG. 1, the virtual device manager 110 creates a virtual device (e.g., virtual device 116) intended to simulate the function of a physical device (e.g., physical device 116') in the physical environment 110'. The system may obtain one or more characteristics of the physical device, including the device make, model, firmware version, software version, or any configuration or parameter settings, such as alarm parameters, data capture settings, sensitivity or threshold settings, and the like. For example, a default value used by the physical device in identifying voltage sag, and an alarm setting for notifying users of the condition, may be used in configuring the virtual device. In one embodiment, the virtual device manager may access a configuration database to obtain characteristics and configuration information used in creating the virtual device. In another embodiment, the virtual device manager may access at least some information from the physical device itself via a network interface.

Any necessary adjustments to the virtual environment are made upon creating of the virtual device and deployment in the virtual environment. For example, other virtual devices in the virtual environment may be notified of the existence of the new virtual device and/or modified accordingly, such as by inserting the virtual device "in-line" in a particular transmission line.

At step 330, the first characteristic of the at least one virtual device is modified to be a second characteristic. In one example, the first characteristic is a parameter value for the at least one virtual device, and the second characteristic is an updated parameter value. For example, the first characteristic may be a value indicating that an alarm is triggered whenever the at least one virtual device experiences a voltage spike at least 10% higher than the average voltage over a period of time, and the second characteristic may be a value indicating that an alarm is triggered whenever the at least one virtual device experiences a voltage spike at least 15% higher than the average voltage over a period of time. In another example, the first and second characteristics are a current and updated version of firmware, respectively, for the at least one physical device corresponding to the at least one virtual device. In another example, the first characteristic is an indication that the at least one virtual device has a status of "ACTIVE" in the virtual environment, and the second characteristic is an indication that the at least one virtual device has a status of "INACTIVE" in the virtual environment.

In some embodiments, the system may monitor the physical environment continuously or periodically to detect any modifications to the physical devices in the physical environment. The system may monitor the physical environment via a Platform-as-a-Service (PaaS) environment, by monitoring a change log, or by receiving status updates from the physical environment. In response to any modifications being detected, the virtual environment may be modified to reflect the modifications to the physical environment. In one example, at least one virtual device may be inactivated and/or removed in response to detecting that at least one physical device has been inactivate or removed. In another example, a parameter of at least one virtual device be modified to have the same value that at least one physical device has after a modification of the parameter of the at least one physical device is detected. In another example, a firmware version of at least one virtual device is updated in response to detecting that the firmware version of at least one physical device has been updated.

In some embodiments, the characteristic of the at least one virtual device is modified by modifying the virtual device itself, or by modifying a configuration file or record associated with the virtual device in the virtual environment. In some embodiments, a record of the modification may be created, so that in the event the modification is later "rolled back" the status and configuration of the at least one virtual device can be restored to a state prior to the modification. The modification record may include the date, time, first characteristic, second characteristic, user or system making the modification, and any other information necessary to roll back the modification.

In some embodiments, the modification of the characteristic is validated against solution configuration rules or other validation criteria according to which any changes to the virtual environment must comply. The validation criteria may be provided with the system or by users or administrators, and may be configurable. The validation criteria may represent physical constraints of the system, defined thresholds or limits, or contractual or regulatory requirements. For example, the validation criteria may identify certain configuration parameters or conditions that must be satisfied. If the validation criteria are not satisfied, the modification may be disallowed, or a warning may be issued to the user. In some embodiments, a rejection of a modification according to the system rules may be overridden by a user with sufficient credentials.

At step 340, a performance of the virtual environment is simulated according to actual conditions detected on the power system and the at least one virtual device having the second characteristic. In the example shown in FIG. 1, a simulation the simulation engine 140 simulates, in the virtual environment 110, conditions or phenomena that have been or may be experienced in the physical environment 110'. For example, events such as loads switching on or off, simulated faults, or voltage spikes or sags may be applied to the virtual environment. The virtual power monitor monitors the simulation and takes action with respect to the virtual environment and/or the virtual devices accordingly. The simulation engine may interact with the system by examining the configuration or other characteristics of the at least one virtual device to determine the effect or outcome of an event with respect to the at least one virtual device, and may communicate that effect or outcome to the virtual power monitor.

Consider an example where a power spike in the power system is simulated. The simulation engine examines a configuration of at least one virtual device in the virtual environment to determine the type of device and parameters relevant to detecting and responding to a voltage spike. For example, the simulation engine may determine that the virtual device is a particular type of power meter, and is configured to trigger an alarm to the virtual power monitor where a voltage spike is detected that is at least 10% higher than the average voltage over a period of time. The simulation engine may determine that the simulated voltage spike represents a voltage spike that is 13% higher than the average voltage over a period of time. In response, the simulation engine communicates a voltage spike alarm to the virtual power monitor in a format expected for that particular type of power meter. In some embodiments, the simulation engine may be configured to modify virtual devices directly. For example, it may be determined that a voltage spike over a certain magnitude would damage a physical device represented by a virtual device, rendering it inoperable. In that case, the simulation engine may modify the virtual device by changing its status from "ACTIVE" to "INACTIVE." The virtual power monitor may detect the change in status and modify the virtual environment accordingly, such as by activating a previously-inactive backup meter.

Conditions or events may be applied to the virtual environment and/or the virtual devices as individual simulated events, or as sequences of events (e.g., as part of a test routine). In some embodiments, test suites may be provided with the system, so that a configuration of the virtual environment can be tested against expected or possible phenomena or sequences of phenomena. A user interface may be provided for setting up a simulation routine by scheduling one or more phenomena to occur during the simulation.

In some embodiments, historical conditions previously observed in the physical environment and recorded may be applied to the virtual environment by the simulation engine. For example, an hour's worth of periodic voltage readings on a physical environment may be recorded, and one or more phenomena, such as voltage sag, detected. The simulation engine may apply those voltage readings to the virtual environment to determine how the virtual environment would respond to those voltage readings. The simulation engine may also record how the virtual environment 110 performs over a certain period of time, allowing for later review and investigation.

The performance of the virtual environment during the simulation may be evaluated to determine if the at least one virtual device and/or the virtual environment functioned acceptably with the at least one virtual device having the second characteristic. If so, the modification (from the first characteristic to the second characteristic) may be considered successful, meaning that the modification may be suitable for rolling out to the physical devices in the physical environment.

Accordingly, at step 350, a configuration for the at least one physical device is created, with the configuration incorporating the second characteristic. In one example, an updated parameter value for the at least one physical device is set. For example, a threshold value for triggering a voltage spike alarm may be modified from least 10% higher than the average voltage over a period of time to 15%. In another example, an updated version of firmware for the physical device may be provided, or instructions to access the updated version may be provided to the physical device. In another example, the status of the physical device may be changed from "ACTIVE" to "INACTIVE," or the machine may be instructed to turn itself off, reboot, or otherwise disable itself.

The configuration may be provided as a series of values propagated to individual physical devices, and/or may be provided as an updated configuration file for the physical power monitor in the physical environment. The physical power monitor may be configured to make or arrange for the necessary changes directly to the physical environment. In some embodiments, a copy of the configuration of the virtual power monitor is provided to the physical power monitor. In other embodiments, a set of change instructions or a change log may be provided to the physical environment to be enacted. In still other embodiments, a change log may be provided to a user or administrator for changes to be made manually to the physical environment and/or the physical devices.

The method 300 may be used to simulate a performance of a physical device that has not yet been added to the physical environment. In particular, at least one virtual device may be created that does not correspond to a physical device in the physical environment. The at least one virtual device may be configured to reflect the characteristics of the at least one virtual device to be added.

Method 300 ends at step 360.

In some embodiments, a graphical user interface is provided that shows the status and other characteristics of the virtual environment and the virtual devices therein, as well as their relationship to and correspondence with the physical environment and the physical devices therein. The graphical user interface may also allow for interaction with the virtual environment, virtual devices, physical environment, and/or physical devices.

Figure 4:
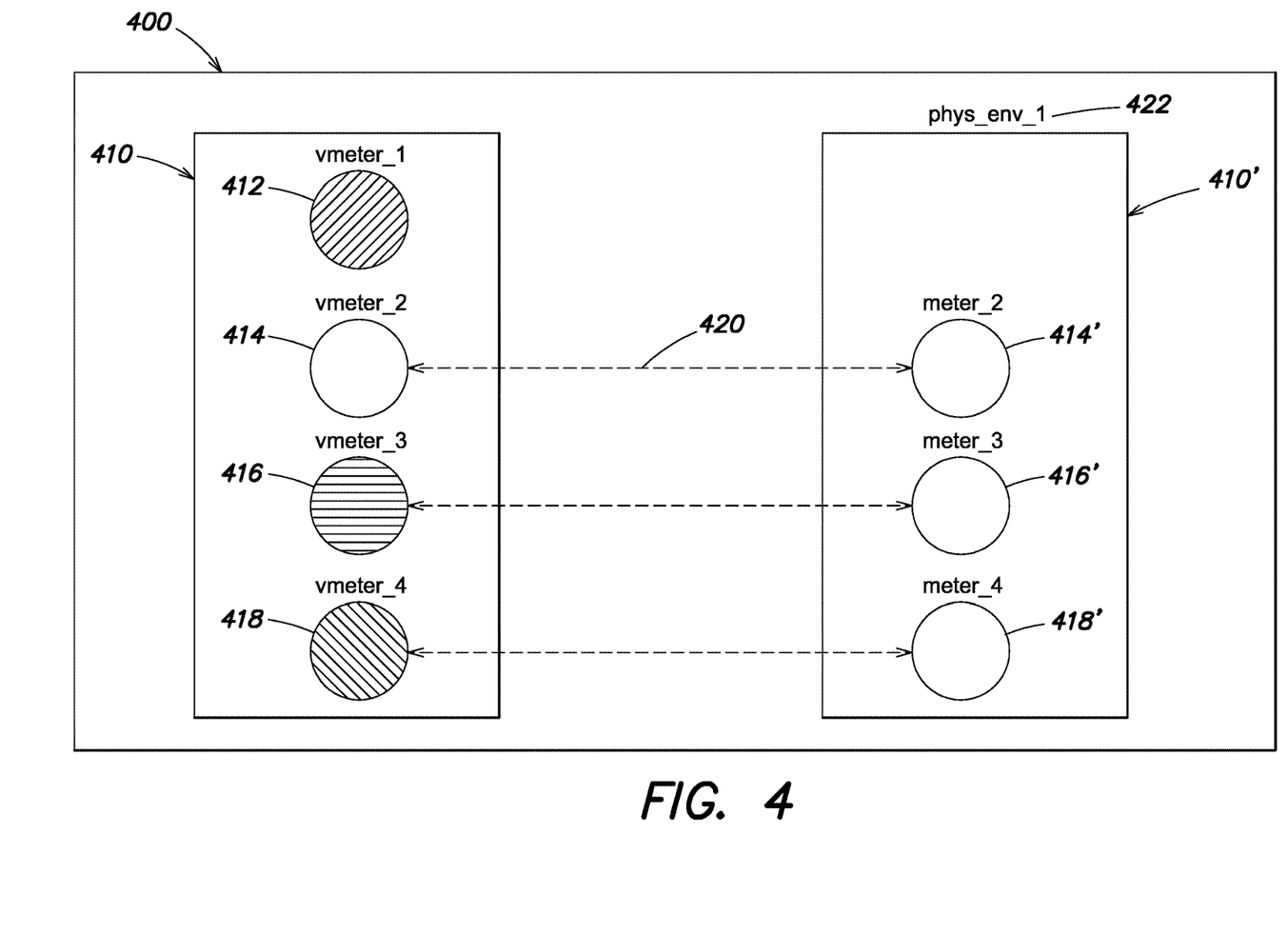
FIG. 4 is an example of a user interface.

An exemplary graphical user interface 400 is shown in FIG. 4. The interface 400 includes a virtual environment region 410 including a plurality of virtual device icons 412, 414, 416, 418, and a physical environment region 410' including a plurality of physical device icons 414', 416', 418'. One or more connectors may visually indicate a relationship between a virtual device icon and a physical device icon, indicating that they depict a virtual device that represents a physical device. For example, connector 420 indicates that the virtual device vmeter_2 indicated by virtual device icon 414 mirrors or otherwise represents the physical device meter_2, indicated by physical device icon 414'. A label 422 or other identifier of the physical environment represented by physical environment region 410' may be provided.

The appearance of a virtual device icon may be modified to indicate a status of the corresponding physical device. For example, virtual device icon 412 appears in a color or cross-hatching scheme indicating that there is no corresponding physical device, due to the physical device being removed or otherwise inactivated. Virtual device icon 414 appears in a color or cross-hatching scheme indicating that the virtual device it represents has the same or substantially the same configuration as the corresponding physical device, represented by physical device icon 414' (i.e., the virtual device is a mirror of the physical device). Virtual device icon 416 appears in a color or cross-hatching scheme indicating that the virtual device it represents has a different configuration than the corresponding physical device, represented by physical device icon 416'. For example, a characteristic of the virtual device represented by virtual device icon 416 may have been modified (e.g., from a first characteristic to a second characteristic) in order to run a simulation of a planned change to the physical environment, but the corresponding modification may not have been made to the physical environment yet. Virtual device icon 418 appears in a color or cross-hatching scheme indicating that the virtual device it represents is new, for example, due to the recently detected addition of the physical device represented by the physical device icon 418'.

The virtual device icons 412, 414, 416, 418 and the physical device icons 412', 414', 416', and 418' may provide additional interactive features. For example, moving a pointing device such as a mouse or trackball to "roll over" or otherwise activate an icon may cause a window to be displayed with information about the virtual or physical device represented by the icon. For example, hovering over the virtual device icon 412 may indicate a date/time that the associated virtual device is scheduled to be deleted. Similarly, hovering over the virtual device icon 416 may indicate how the associated virtual device differs from the physical device represented by physical device icon 416', such as by showing the parameters that differ, and/or showing a date/time that a change to the physical device is scheduled.

The virtual device icons 412, 414, 416, 418 and the physical device icons 412', 414', 416', and 418' may also allow for interaction with the virtual environment and/or the physical environment. For example, clicking on a virtual device icon may allow the user to "reset" the associated virtual device to mirror the related physical device, thereby undoing any modifications made for simulation or other purposes. As another example, clicking on a virtual device icon may allow the user to inspect and/or modify characteristics of the virtual device. Additional interface elements (not shown) may allow a user to add or remove virtual devices.

Computer System

Returning to FIG. 1, one or more components of the system, including the virtual environment 110, virtual power monitor 120, virtual device manager 130, simulation engine 140, configuration generator 150, and interface 160, may include a computerized control system. As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers, and web servers.

Other examples of computer systems may include mobile computing devices (e.g., smart phones, tablet computers, and personal digital assistants) and network equipment (e.g., load balancers, routers, and switches). Examples of particular models of mobile computing devices include iPhones, iPads, and iPod touches running iOS operating system available from Apple, Android devices like Samsung Galaxy Series, LG Nexus, and Motorola Droid X, Blackberry devices available from Blackberry Limited, and Windows Phone devices. Further, aspects may be located on a single computer system or may be distributed among a plurality of computer systems connected to one or more communications networks.

Figure 5:
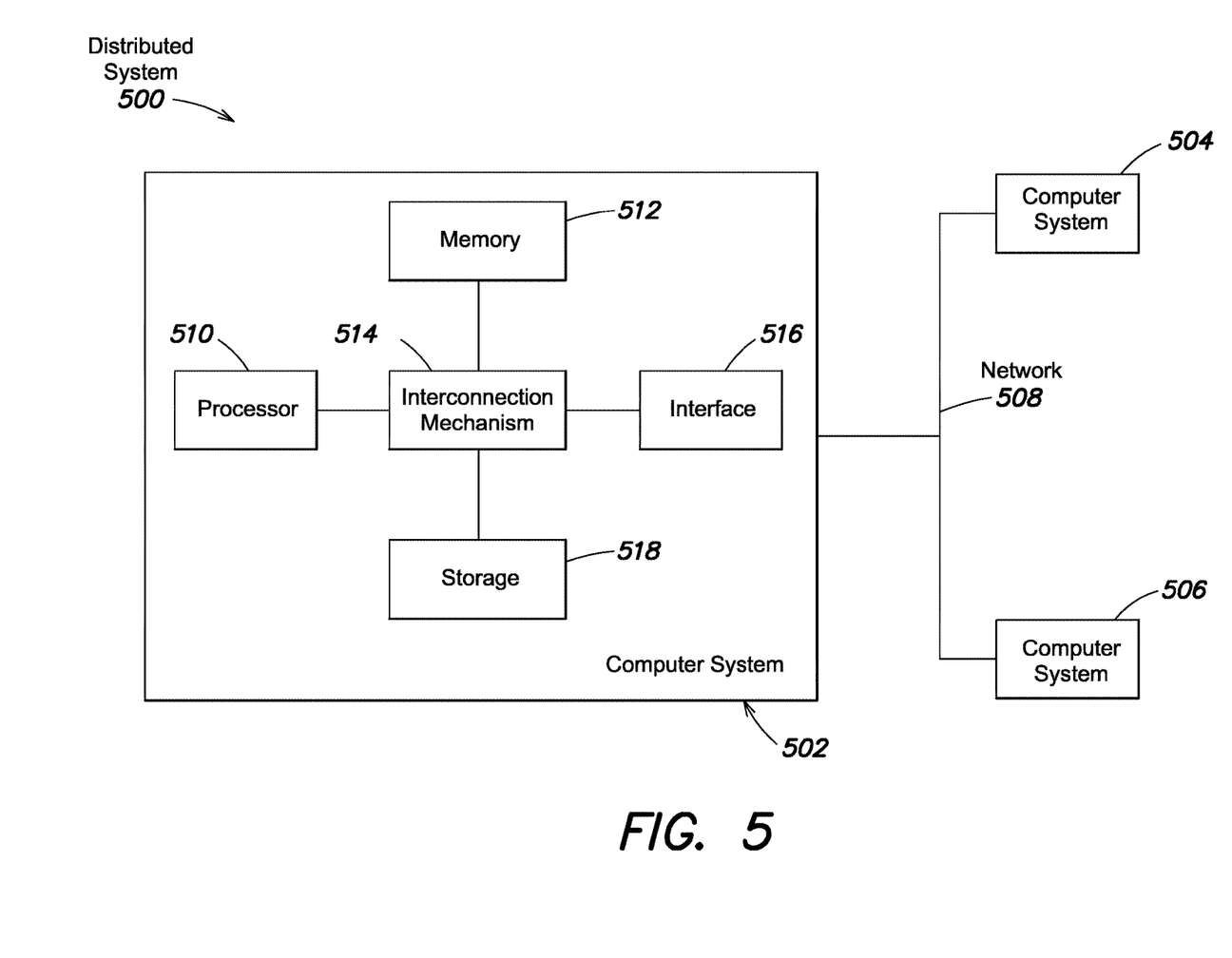
FIG. 5 is a schematic of a computer system included in embodiments of a system for operating a virtual power system environment.

For example, various aspects, functions, and processes may be distributed among one or more computer systems configured to provide a service to one or more client computers, or to perform an overall task as part of a distributed system, such as the distributed computer system 500 shown in FIG. 5. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Referring to FIG. 5, there is illustrated a block diagram of a distributed computer system 500, in which various aspects and functions are practiced. As shown, the distributed computer system 500 includes one or more computer systems that exchange information. More specifically, the distributed computer system 500 includes computer systems 502, 504, and 506. As shown, the computer systems 502, 504, and 506 are interconnected by, and may exchange data through, a communication network 508. The network 508 may include any communication network through which computer systems may exchange data. To exchange data using the network 508, the computer systems 502, 504, and 506 and the network 508 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST, and Web Services. To ensure data transfer is secure, the computer systems 502, 504, and 506 may transmit data via the network 508 using a variety of security measures including, for example, SSL or VPN technologies. While the distributed computer system 500 illustrates three networked computer systems, the distributed computer system 500 is not so limited and may include any number of computer systems and computing devices, networked using any medium and communication protocol.

As illustrated in FIG. 5, the computer system 502 includes a processor 510, a memory 512, an interconnection element 514, an interface 516 and data storage element 518. To implement at least some of the aspects, functions, and processes disclosed herein, the processor 510 performs a series of instructions that result in manipulated data. The processor 510 may be any type of processor, multiprocessor or controller. Example processors may include a commercially available processor such as an Intel Xeon, Itanium, Core, Celeron, or Pentium processor; an AMD Opteron processor; an Apple A4 or A5 processor; a Sun UltraSPARC processor; an IBM Power5+ processor; an IBM mainframe chip; or a quantum computer. The processor 510 is connected to other system components, including one or more memory devices 512, by the interconnection element 514.

The memory 512 stores programs (e.g., sequences of instructions coded to be executable by the processor 510) and data during operation of the computer system 502. Thus, the memory 512 may be a relatively high performance, volatile, random access memory such as a dynamic random access memory ("DRAM") or static memory ("SRAM"). However, the memory 512 may include any device for storing data, such as a disk drive or other nonvolatile storage device. Various examples may organize the memory 512 into particularized and, in some cases, unique structures to perform the functions disclosed herein. These data structures may be sized and organized to store values for particular data and types of data.

Components of the computer system 502 are coupled by an interconnection element such as the interconnection element 514. The interconnection element 514 may include any communication coupling between system components such as one or more physical busses in conformance with specialized or standard computing bus technologies such as IDE, SCSI, PCI and InfiniBand. The interconnection element 514 enables communications, including instructions and data, to be exchanged between system components of the computer system 502.

The computer system 502 also includes one or more interface devices 516 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 502 to exchange information and to communicate with external entities, such as users and other systems.

The data storage element 518 includes a computer readable and writeable nonvolatile, or non-transitory, data storage medium in which instructions are stored that define a program or other object that is executed by the processor 510. The data storage element 518 also may include information that is recorded, on or in, the medium, and that is processed by the processor 510 during execution of the program. More specifically, the information may be stored in one or more data structures specifically configured to conserve storage space or increase data exchange performance. The instructions may be persistently stored as encoded signals, and the instructions may cause the processor 510 to perform any of the functions described herein. The medium may, for example, be optical disk, magnetic disk or flash memory, among others. In operation, the processor 510 or some other controller causes data to be read from the nonvolatile recording medium into another memory, such as the memory 512, that allows for faster access to the information by the processor 510 than does the storage medium included in the data storage element 518. The memory may be located in the data storage element 518 or in the memory 512, however, the processor 510 manipulates the data within the memory, and then copies the data to the storage medium associated with the data storage element 518 after processing is completed. A variety of components may manage data movement between the storage medium and other memory elements and examples are not limited to particular data management components. Further, examples are not limited to a particular memory system or data storage system.

Although the computer system 502 is shown by way of example as one type of computer system upon which various aspects and functions may be practiced, aspects and functions are not limited to being implemented on the computer system 502 as shown in FIG. 5. Various aspects and functions may be practiced on one or more computers having a different architectures or components than that shown in FIG. 5. For instance, the computer system 502 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 502 may be a computer system including an operating system that manages at least a portion of the hardware elements included in the computer system 502. In some examples, a processor or controller, such as the processor 510, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Oracle Corporation, or a UNIX operating systems available from various sources. Many other operating systems may be used, and examples are not limited to any particular operating system.

The processor 510 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user space application) or in a commonly shared data structure (such as an application registry that is defined by an operating system). In addition, some examples provide for both system and user interfaces that allow external entities to modify the parameters and thereby configure the behavior of the components.

Based on the foregoing disclosure, it should be apparent to one of ordinary skill in the art that the invention is not limited to a particular computer system platform, processor, operating system, network, or communication protocol. Also, it should be apparent that the present invention is not limited to a specific architecture or programming language.

The system and methods described herein may be employed in any number of related applications. For example, the embodiments discussed herein may be employed in other parts of power systems besides monitoring subsystems. The systems and methods described here may be used in creating and testing a virtual environment mirroring the power distribution components of the system itself, such as generators, transformers, transmission lines, and the like. An entire geographic or logical region (or multiple regions) may be mirror in a virtual environment. The present systems and methods may also be used in a non-production environment for training or educational purposes. For example, users (such as students) may be provided access to a virtual environment that represents a fictional and/or simplified power system used for training purposes. Historical data may be played back as a simulation to allow the students to observe how the power system monitoring environment works, how it responds to certain conditions and phenomena, and how changes to the system affect its performance.

Having thus described several aspects of at least one embodiment of this invention, it is to be appreciated various alterations, modifications, and improvements will readily occur to those skilled in the art. Any feature described in any embodiment may be included in or substituted for any feature of any other embodiment. Acts of methods disclosed herein may be performed in alternate orders, and one or more of the acts may be omitted or replaced by an alternative act. The methods disclosed herein may include additional acts not explicitly described. Such alterations, modifications, and improvements are intended to be part of this disclosure, and are intended to be within the scope of the invention. Accordingly, the foregoing description and drawings are by way of example only.

What is claimed is:

1. A computer system for hosting a virtual power system environment, the system comprising at least one processor operatively connected to a memory, the at least one processor when executing being configured to execute:
   a plurality of virtual devices, wherein at least one of the plurality of virtual devices is configured to simulate functionality of at least one physical device in a power system for distributing electricity;
   a virtual device manager configured to perform at least one operation on the plurality of virtual devices;
   a virtual power monitor configured to monitor and control at least one function of the plurality of virtual devices;
   a simulation engine configured to simulate a performance of the plurality of virtual devices according to conditions detected on the power system, and further configured to validate, from the simulated performance, that an expected change to at least one of the plurality of virtual devices has occurred in response to the conditions; and
   a configuration generator configured to generate, responsive to the validation being successful, one or more configuration parameters for operating a physical power monitor according to a configuration of the virtual power monitor.

2. The system according to claim 1, wherein the at least one physical device in the power system is a metering device, and the at least one virtual device is configured to simulate the at least one metering device on the power system.

3. The system according to claim 1, wherein the at least one operation is selected from the group consisting of an add operation, a modify operation, and a delete operation.

4. The system according to claim 3, wherein the at least one operation comprises an operation to modify a firmware component of one of the plurality of virtual devices.

5. The system according to claim 1, wherein a second at least one of the plurality of virtual devices represents at least one physical device not in the power system.

6. The system according to claim 1, the virtual device manager further comprising a web-based user interface configured to receive an instruction to perform the at least one operation.

7. The system according to claim 1, wherein the virtual device manager is further configured, responsive to detecting a change to at least one physical device in the power system, to effect the change on at least one of the plurality of virtual devices.

8. The system according to claim 1, wherein the virtual power monitor is further configured to selectively control a function of the power system.

9. The system according to claim 1, wherein the virtual device manager is implemented as software as a service.

10. A method for operating a virtual power system environment comprising at least one processor operatively connected to a memory, the method comprising:
    creating, in a virtual environment, at least one virtual device having a first characteristic and configured to simulate functionality of at least one physical device in a power system for distributing electricity;
    modifying, by the at least one processor, the first characteristic to be a second characteristic;
    simulating, by the at least one processor, a performance of the virtual environment according to actual conditions detected on the power system and the at least one virtual device having the second characteristic;
    validating, from the simulated performance, that an expected change to the at least one virtual device having the second characteristic has occurred in response to the conditions; and
    responsive to the validation being successful, generating one or more configuration parameters for operating the at least one physical device, the configuration including the second characteristic.

11. The method according to claim 10, wherein the first characteristic is a first value for a configuration setting for the at least one device, and the second characteristic is a second value for the configuration setting.

12. The method according to claim 10, wherein the first characteristic is a first version of firmware for at least one physical device corresponding to the at least one virtual device, and wherein the second characteristic is a second version of firmware.

13. The method according to claim 10, wherein the first characteristic indicates that the at least one virtual device is active, and the second characteristic indicates that the at least one virtual device is inactive.

14. The method according to claim 10, further comprising creating, in the virtual environment, a second at least one virtual device not corresponding to a physical device in the power system.

15. The method according to claim 10, further comprising:
    monitoring the at least one physical device in the power system;
    detecting a modification to at least one physical device, the at least one physical device corresponding to a first virtual device;
    modifying the first virtual device according to the modification to the at least one physical device.

16. The method according to claim 15, wherein detecting the modification to the at least one physical device comprises detecting that the at least one physical device has been deactivated, and wherein modifying the first virtual device according to the modification to the at least one physical device comprises deactivating the first virtual device.

17. The method according to claim 10, further comprising generating a configuration for the virtual power monitor.

18. The method according to claim 17, further comprising validating the configuration for the virtual power monitor by determining that the configuration is suitable for use as a configuration for a physical power monitor in the power system.

19. The method according to claim 10, further comprising:
   storing the first characteristic and the second characteristic; and responsive to a determination that the at least one physical device having the second characteristic has performed undesirably, creating a second configuration for the at least one physical device, the second configuration including the first characteristic.

20. The system according to claim 1, wherein the condition is a simulated voltage spike in the power system, and the expected change is at least one of a change in an alarm status of at least one of the plurality of virtual devices and a change of an operating status of at least one of the plurality of virtual devices from active to inactive.

* * * * *